(12) United States Patent
Nishimura

(10) Patent No.: US 8,166,082 B2
(45) Date of Patent: Apr. 24, 2012

(54) VARIABLE LENGTH DATA STORAGE DEVICE, VARIABLE LENGTH DATA STORAGE METHOD, VARIABLE LENGTH DATA READING METHOD, AND A PROGRAM FOR THE SAME

(75) Inventor: Nobuhiko Nishimura, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 564 days.

(21) Appl. No.: 12/323,162

(22) Filed: Nov. 25, 2008

(65) Prior Publication Data

US 2009/0144348 A1  Jun. 4, 2009

(30) Foreign Application Priority Data

Nov. 30, 2007  (JP) .................................. 2007-311119

(51) Int. Cl.
*G06F 17/30* (2006.01)
(52) U.S. Cl. .......................................... 707/830; 341/67
(58) Field of Classification Search .................. 707/823, 707/830
See application file for complete search history.

(56) References Cited

U.S. PATENT DOCUMENTS

| | | | |
|---|---|---|---|
| 4,775,615 A | 10/1988 | Matsuzaka et al. | |
| 4,917,996 A | 4/1990 | Matsuzaka et al. | |
| 5,450,580 A | 9/1995 | Takada | |
| 5,546,578 A | 8/1996 | Takada | |
| 5,586,292 A * | 12/1996 | Yamaguchi | 711/114 |
| 6,058,392 A * | 5/2000 | Sampson et al. | 707/6 |
| 2007/0177225 A1 | 8/2007 | Morishita | |

FOREIGN PATENT DOCUMENTS

| | | |
|---|---|---|
| JP | 05-181719 | 7/1993 |
| JP | 06-060120 | 3/1994 |
| JP | 08-263338 | 10/1996 |
| JP | 2001-197117 | 7/2001 |
| JP | 2007-228555 | 9/2007 |

OTHER PUBLICATIONS

Haddon et al.,"A compaction procedure for variable-length storage elements", 1967.*

* cited by examiner

*Primary Examiner* — Shahid Alam
*Assistant Examiner* — Dawaune Conyers

(57) ABSTRACT

A variable length data storage device enables clearly and quickly determining where there are breaks in variable length data even when the variable length data is stored without gaps therebetween in a stored data file. A variable length data storage step (S509) stores a plurality of variable length items, each containing variable length data including at the beginning the data length of the variable length data, without gaps therebetween in a stored data file. A marker management item registration step (step S510) registers a plurality of marker management items, each containing a break marker and the storage location of the variable length data corresponding to the break marker, in a marker management file. A marker identifier management item registration step (step S511) registers a plurality of marker identifier management items, each including a marker identifier composed of a predetermined number of characters from the beginning of the text string used as the break marker and the storage location of the break marker, in a marker management memory area.

7 Claims, 7 Drawing Sheets

| MARKER IDENTIFIER NAME | FILE ID | MARKER NAME LOCATION | |
|---|---|---|---|
| MARKER IDENTIFIER [1] | 1 | 0 0 0 0 | ← MARKER IDENTIFIER MANAGEMENT ITEM [1] |
| MARKER IDENTIFIER [2] | 1 | 0 2 5 6 | ← MARKER IDENTIFIER MANAGEMENT ITEM [2] |
| ⋮ | ⋮ | ⋮ | |
| MARKER IDENTIFIER [n] | 1 | 1 0 2 4 | ← MARKER IDENTIFIER MANAGEMENT ITEM [n] |
| ⋮ | ⋮ | ⋮ | |
| MARKER IDENTIFIER [x] | 1 | 2 0 4 8 | ← MARKER IDENTIFIER MANAGEMENT ITEM [x] |
| MARKER IDENTIFIER [x+1] | 2 | 2 3 0 4 | ← MARKER IDENTIFIER MANAGEMENT ITEM [x+1] |
| ⋮ | ⋮ | ⋮ | |
| MARKER IDENTIFIER [x+n] | 2 | 4 0 9 6 | ← MARKER IDENTIFIER MANAGEMENT ITEM [x+n] |
| "FREE AREA" (MARKER MANAGEMENT MEMORY) | | | |

FIG. 4

VARIABLE LENGTH DATA STORAGE DEVICE, VARIABLE LENGTH DATA STORAGE METHOD, VARIABLE LENGTH DATA READING METHOD, AND A PROGRAM FOR THE SAME

CROSS-REFERENCE TO RELATED APPLICATIONS

Japanese Patent application No. 2007-311119, is hereby incorporated by reference in its entirety.

BACKGROUND

1. Field of Invention

The present invention relates to managing files in a computer, relates more particularly to a storage device for storing variable length data files of different content and different length, to a method of storing variable length data files in the storage device, to a method of reading from the storage device, and to a program enabling the same.

2. Description of Related Art

Japanese Unexamined Patent Appl. Pub. JP-A-2007-228555 teaches a data storage method for segmenting image data for a scanned document into a plurality of files, compressing the segmented image data using a predetermined standard method (JPEG), and storing the image data with JPEG markers indicating the content of the image data. By changing the image size to which the compression process is applied according to the amount of available memory, this method enables handling scanned images of documents in a standard image format that can also be handled by other printing devices and personal computers, for example, as well as images that are larger than the standard management size.

One method of handling variable length data predicts the maximum length of the variable length data items and reserves fixed-length data fields of a size equal to each predicted maximum item length (such as 255 bytes) in a data file to simulate handling variable length data. Another method records each variable length data item from the beginning of a fixed-length data field, and fills the remaining portion (where variable length data is not recorded) with special data that is not normally used as data that is processed or manipulated. Because this method enables using variable length data as fixed-length data, the location of each variable length data item in the data file can be easily calculated. However, because storage areas sized to the maximum expected length of the variable length data items are always reserved, a problem of wasted storage space occurs in the storage device, and if variable length data exceeding the predicted maximum length of the variable length data occurs, handling (processing) the data becomes difficult.

Another method of handling variable length data stores the variable length data items sequentially with no gaps therebetween in the data file, and reads the variable length data items one by one from the beginning of the data file (in actuality reading one word at a time) to find the desired variable length data item. This method can effectively use the storage area of the storage device because it predicts the maximum length of the variable length data items and does not reserve fixed-length data fields sized to this predicted maximum length, but processing to read the desired variable length data item can be time-consuming because the variable length data must be read and evaluated one at a time from the beginning of the data file in order to find the desired variable length data.

Japanese Unexamined Patent Appl. Pub. JP-A-H06-60120 and Japanese Unexamined Patent Appl. Pub. JP-A-H08-263338 teach examples of solutions for the foregoing problems of the related art.

Japanese Unexamined Patent Appl. Pub. JP-A-H06-60120 teaches a structure including at least one data file storing a plurality of variable length data items, at least one index data file having a 1:1 relationship to a data file and storing the storage location of each variable length data item in the data file, and at least one search criteria file storing an index file name and the storage location of each search criteria entry in the index file. An attribute identifier and an end identifier are respectively added before and after each variable length data item, and auxiliary data of an undefined length that is not searched is added as necessary between the end identifier of one variable length data item and the attribute identifier of the next variable length data item.

When creating or updating a data file in which contiguous variable length data items are stored in blocks, Japanese Unexamined Patent Appl. Pub. JP-A-H08-263338 teaches storing the total average data count per block, which is the average number of variable length data items stored in all blocks stored in the data file, and the partial average data count per block, which is the average number of data items stored in each of the blocks from the first block in the data file to each particular block, in the data file. To find a variable length data item of a specified number in the data file, the specified variable length data item is found using the total average data count per block, the partial average data count per block, and the number of the desired variable length data item.

However, because there may be more than one stored data file for one data file with the structure taught in Japanese Unexamined Patent Appl. Pub. JP-A-H06-60120, the stored data files must be opened one after the other on the main storage device until the specified search criteria is found when a variable length data search is specified, and the search process therefore cannot be accelerated. Another problem is that because auxiliary data of an undefined length that is not used for searching is added as needed to the data files, the storage area of the storage device cannot be used effectively.

While the technology taught in Japanese Unexamined Patent Appl. Pub. JP-A-H08-263338 enables effectively using the storage space in the storage device because variable length data items are stored contiguously in the data file, searching for specified variable length data is done by the process described below.

First, the number of the specified variable length data item is divided by the total average data count per block to calculate the block number of the block in which the specified variable length data item is thought to be stored. The block of the calculated block number is then sought, the variable length data stored at the beginning of that block is read to get its number. If the number of the variable length data item is greater than the number of the specified variable length data, the specified variable length data is stored in a block before that block. The partial average data count per block of the block identified by the foregoing calculation is therefore read, and the number of the specified variable length data is divided by the partial average data count per block to again calculate the block number of the block in which the specified variable length data item is thought to be stored. This process then repeats until the data count of the first data item in the calculated block is less than or equal to the number of the specified variable length data item. When the data count of the first data item in the calculated block becomes less than or equal to the specified variable length data, the variable length data is read sequentially from the beginning of that block, and whether the specified variable length data was found is confirmed.

The method taught in Japanese Unexamined Patent Appl. Pub. JP-A-H08-263338 enables faster processing than a method in which variable length data (actually read in word units) must be read one at a time from the beginning of the data file in order to find the specified variable length data, but because the calculations must be repeated and the location of the specified variable length data cannot be determined directly, the search process is not necessarily faster.

SUMMARY OF INVENTION

A variable length data storage device, a variable length data storage method, a variable length data reading method, and a program for the same according to at least one embodiment of the present invention are directed to the foregoing problems of the related art and enable clearly and quickly determining the locations of breaks between variable length data items even when the variable length data is stored contiguously without gaps therebetween in a data file (a stored data file).

A variable length data storage device according to at least one embodiment of the invention has a stored data file in which variable length items including variable length data and the data length of the variable length data are stored, a marker management file in which are registered marker management items including a break marker corresponding to the variable length data, and the storage location of the variable length data in the stored data file, and a marker management memory area in which are registered marker identifier management items including a marker identifier composed of specific data in the break marker, and the storage location of the break marker in the marker management file.

This aspect of at least one embodiment of the invention uses marker identifier management items stored in a marker management memory area with smaller storage capacity than the size of the marker management file to directly read marker management items stored in the marker management file, and can directly read desired variable length data based on the storage location that is stored in the read marker management item for the variable length data in the stored data file. Therefore, because excessive demand is not placed on the main storage device even if all of the saved marker identifier management items are written to the main storage device of the computer for processing, a variable length data storage device that enables quickly reading the desired variable length data while effectively using the storage resources of the computer can be provided.

Preferably, the break marker is a marker name that is generated according to a predetermined rule when the variable length data is produced, and the marker identifier is a marker identifier name.

This aspect of at least one embodiment of the invention can prevent manual data entry errors because the marker name is generated according to a predetermined rule when the variable length data is produced.

This predetermined rule preferably decided based on the date and time when journal information was printed.

Because the predetermined rule uses the date and time when journal information is printed in this aspect of at least one embodiment of the invention, the variable length data is stored in the variable length data storage device only when a transaction has been finalized if the variable length data is sales transaction data, for example.

Another aspect of at least one embodiment of the invention is a variable length data storage method including: storing variable length items including variable length data and the data length of the variable length data in a stored data file, registering marker management items including a marker name for a break marker corresponding to the variable length data, and the storage location of the variable length data in the stored data file, in a marker management file, and registering marker identifier management items including a marker identifier composed of specific data in the break marker, and the storage location of the break marker in the marker management file, in a marker management memory area.

This aspect of at least one embodiment of the invention provides a variable length data storage method that is useful with the variable length data storage device of at least one embodiment of the invention.

Further preferably, the break marker is a marker name that is generated according to a predetermined rule when the variable length data is produced, and the marker identifier is a marker identifier name.

Yet further preferably, the break marker is used after confirming with reference to the marker management memory area and the marker management file that the break marker is not already used as a break marker.

Because this aspect of at least one embodiment of the invention uses a break marker after first confirming that it is not already used as a break marker in the marker management file, it is possible to handle situations in which a break marker identical to a break marker that is already in use is generated due to a failure of the mechanism that creates the break markers. For example, entry errors resulting from enabling manually inputting break marker names can be handled appropriately.

Another aspect of at least one embodiment of the invention is a variable length data reading method for reading desired variable length data from a storage device having a stored data file in which variable length items including variable length data and the data length of the variable length data are stored, a marker management file in which are registered marker management items including a break marker corresponding to the variable length data, and the storage location of the variable length data in the stored data file, and a marker management memory area in which are registered marker identifier management items including a marker identifier composed of specific data in the break marker, and the storage location of the break marker in the marker management file, the reading method including: creating a marker identifier based on input search criteria for comparison with the marker identifier of the marker identifier management item; determining if the created marker identifier matches the marker identifier of the marker identifier management item; determining if the search criteria matches the break marker of the marker management item when the marker identifier evaluation step determines that the created marker identifier matches the marker identifier of the marker identifier management item; and accessing the stored data file and reading the desired variable length data based on the storage location corresponding to the break marker when the search criteria evaluation step determines that the search criteria matches the break marker of the marker management item.

This aspect of at least one embodiment of the invention uses marker identifier management items stored in a marker management memory area with smaller storage capacity than the size of the marker management file to directly read marker management items stored in the marker management file, and can directly read desired variable length data based on the storage location that is stored in the read marker management item for the variable length data in the stored data file. Therefore, because excessive demand is not placed on the main storage device even if all of the saved marker identifier management items are written to the main storage device of the computer for processing, a variable length data storage device that enables quickly reading the desired variable length data while effectively using the storage resources of the computer can be provided.

Preferably, the break marker is a marker name that is generated according to a predetermined rule when the variable length data is produced, and the marker identifier is a marker identifier name.

In the variable length data reading method according to another aspect of at least one embodiment of the invention, when there is an unprocessed marker identifier management item in the marker management memory area, the variable length data reading method described above repeats until there is no longer an unprocessed marker identifier management item in the marker management memory area even if the created marker identifier name is determined to not match the marker identifier name of the marker identifier management item, even if the search criteria is determined to not match the marker name of the marker management item, and even if the search criteria matches the marker name in the marker management item and the desired variable length data was read.

Because the variable length data reading method repeats in this aspect of at least one embodiment of the invention until there are no unprocessed marker identifier management items in the marker management memory area, searching and reading execute reliably without skipping any data.

Further preferably, the number of data values in the search criteria is less than the number of data values in the break marker.

This aspect of at least one embodiment of the invention enables specifying a search using fewer characters in the text string defining the search criteria than the number of characters in the text string rendering the break marker. As a result, all variable length data identified by a break marker matching a higher order search criterion can be found with a single search command.

Another aspect of at least one embodiment of the invention is a storage and reading program causing a computer to execute the variable length data storage method and the variable length data reading method described above.

By installing and running the storage and reading program according to at least one embodiment of the invention, this aspect of at least one embodiment of the invention enables constructing a computer to render the variable length data storage device, the variable length data storage method, and the variable length data reading method of at least one embodiment of the invention.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 4 schematically describes the structure of a marker management memory area in at least one embodiment of the present invention.

DESCRIPTION OF THE PREFERRED EMBODIMENTS

A preferred embodiment of at least one embodiment of the present invention is described below with reference to the accompanying figures.

* Computer

The basic structure of a computer that achieves the variable length data storage device, variable length data storage method, and variable length data reading method of at least one embodiment of the invention is described next with reference to the block diagram in FIG. 1.

Figure 1:
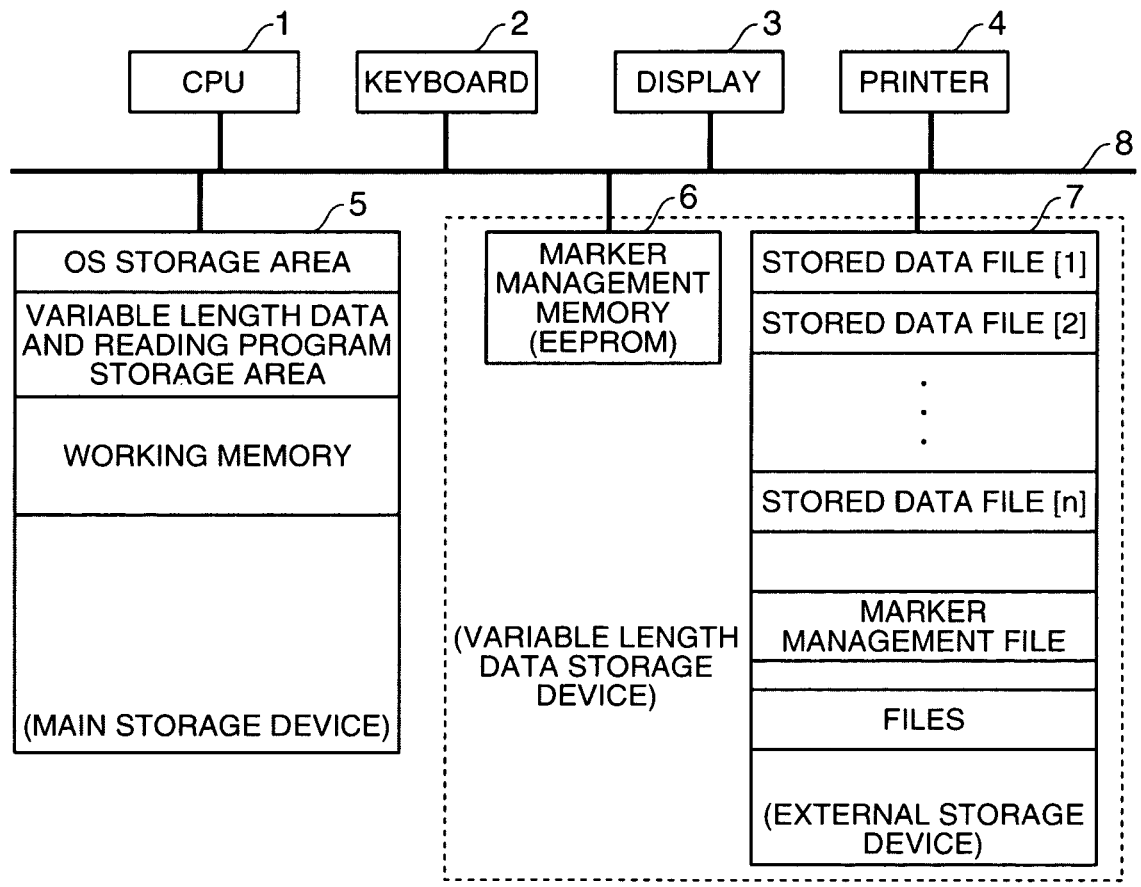
FIG. 1 is a block diagram of a computer for rendering the variable length data storage device, the variable length data storage method, and the variable length data reading method of at least one embodiment of the invention.

As shown in FIG. 1, the computer includes a CPU 1 that controls and judges all processing, keyboard 2, display 3, printer 4, main storage device 5, EEPROM (electrically erasable programmable read-only memory) 6, which is nonvolatile memory, an external storage device 7, and an internal bus 8. The CPU 1, keyboard 2, display 3, printer 4, main storage device 5, marker management memory 6, and external storage device 7 are interconnected by the internal bus 8. The marker management memory 6 and external storage device 7 render the variable length data storage device of at least one embodiment of the invention. The external storage device may be used as the internal storage device.

Disposed in the main storage device 5 are an operating system storage area, variable length data storage and reading program area, and various working memory areas. Stored data files [1] to [n], a marker management file, and various other files are stored in the external storage device 7. The EEPROM 6 is used as the marker management memory area.

* Stored Data File Structure

The structure of a stored data file according to at least one embodiment of the invention is described next with reference to the schematic diagram thereof in FIG. 2.

Figure 2:
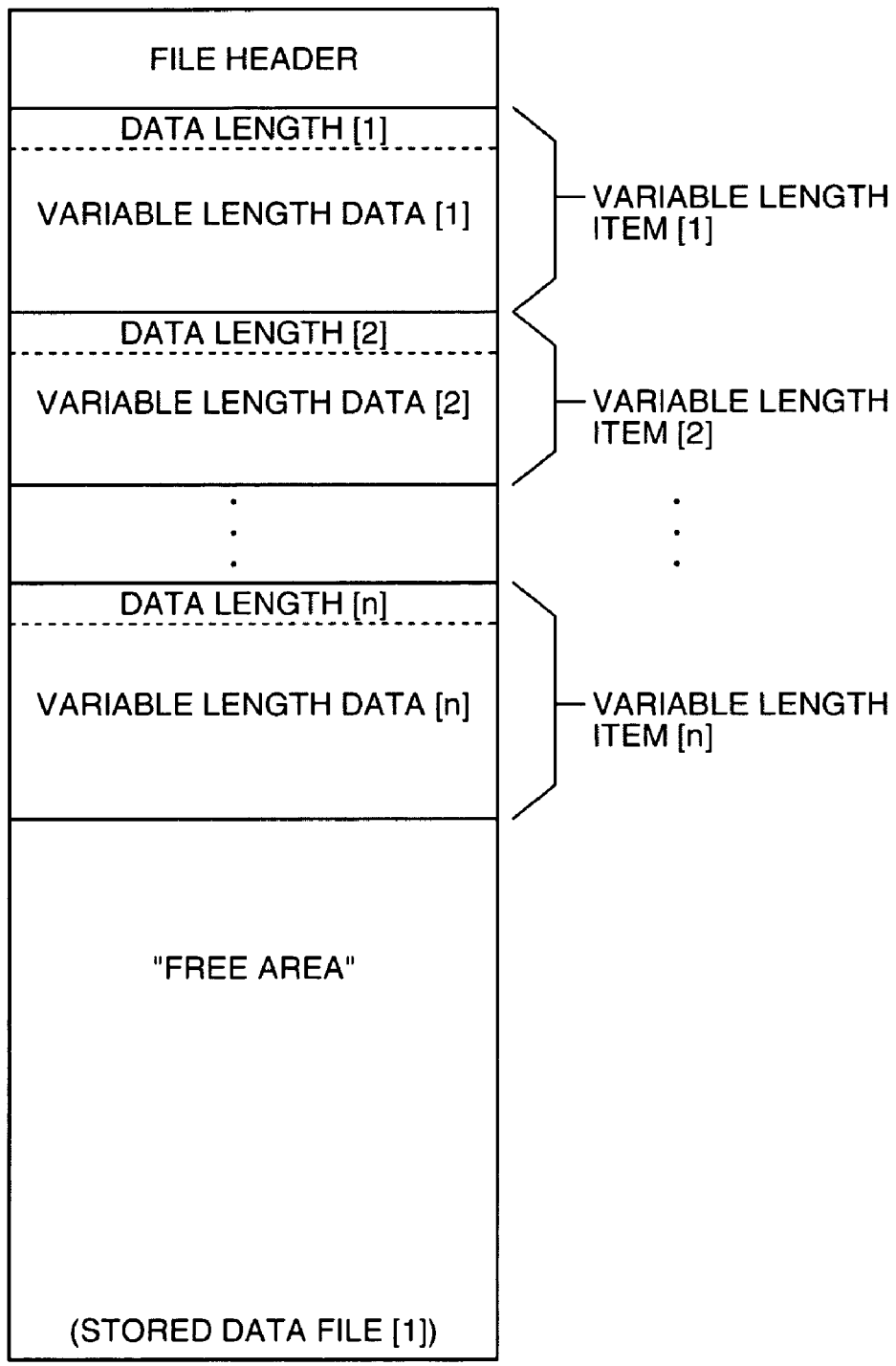
FIG. 2 schematically describes the structure of a stored data file according to at least one embodiment of the present invention.

As shown in FIG. 2 a file header is written at the beginning of the file in stored data file [1], and a number of variable length items are stored contiguously to each other from the end of the file header with no gaps between the data.

The structure of stored data file [1] is described below, and it should be noted that each of the other stored data files [2] to [n] has the same structure.

The file header stores a file type indicating that stored data file [1] is a text data file in this embodiment, data denoting the checksum value for the entire stored data file [1], and data indicating the storage capacity of stored data file [1].

Each variable length item includes the variable length data and the length of the variable length data contained in the variable length item. For example, variable length item [1] contains variable length data [1] starting with data length [1], variable length item [2] contains variable length data [2] starting with data length [n], and variable length item [n] contains variable length data [n] starting with data length [n].

The data length of the variable length data is fixed-length data. Data length [1] to [n] each denotes the length of the corresponding variable length data [1] to [n]. The storage format of the variable length data may be as desired.

* Creating a New Stored Data File

Creating a new stored data file is described next.

Because the stored data file [1] cannot exceed a predetermined size due to file management limitations, the empty storage space in the stored data file eventually disappears as variable length items containing variable length data are stored one after another into the stored data file [1] as variable length data is produced.

When this happens, a new stored data file is created as stored data file [2], and the subsequently produced variable length data is stored in this newly created stored data file [2]. When stored data file [2] becomes full, yet another stored data file [3] is created, and additional variable length data is stored therein in the same way. As long as there is space available in the external storage device 7 of the computer, variable length data can continue to be stored while creating new stored data files as needed.

* Structure of the Marker Management File

The structure of the marker management file according to at least one embodiment of the invention is described next with reference to FIG. 3.

Figure 3:
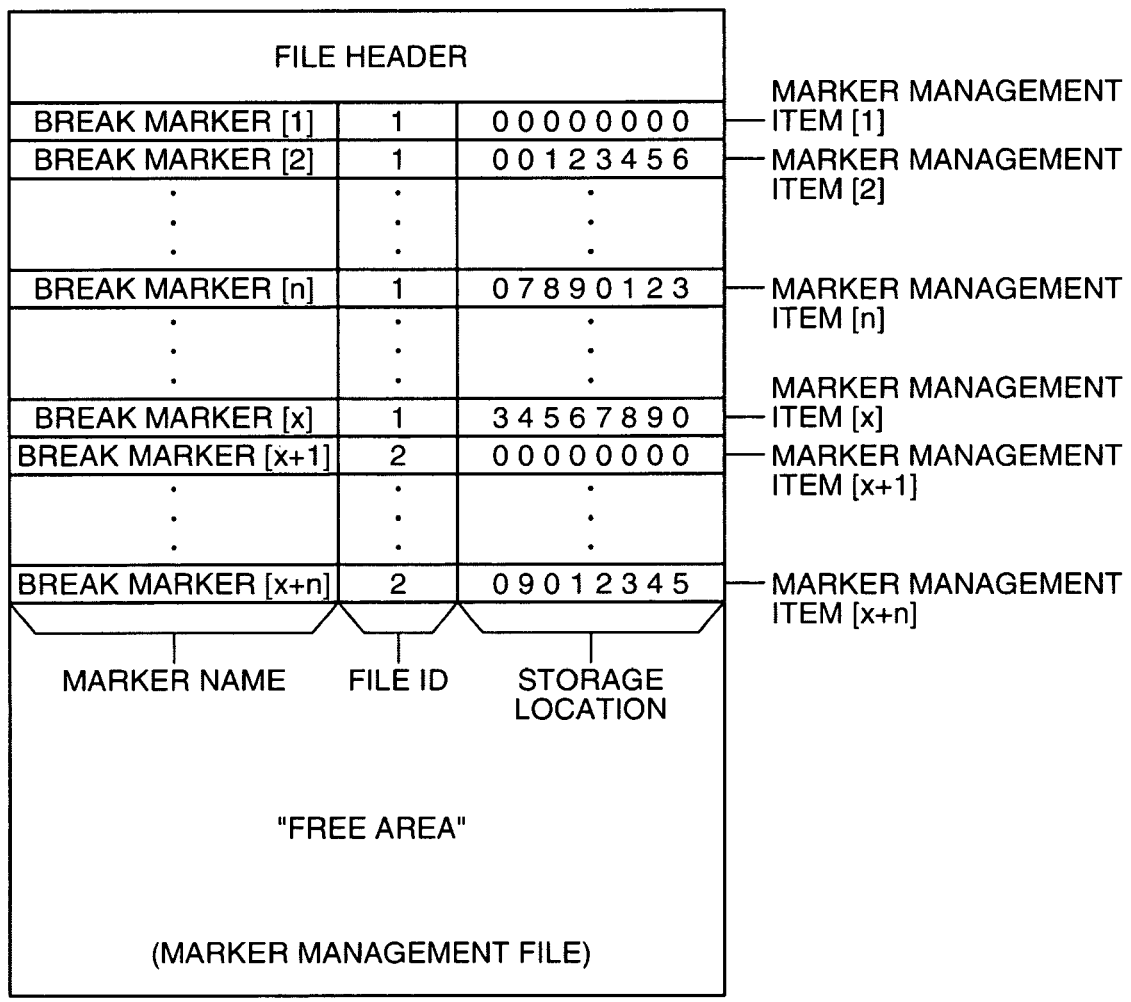
FIG. 3 schematically describes the structure of a marker management file according to at least one embodiment of the present invention.

As shown in FIG. 3, the marker management file starts with a file header and stores a plurality of marker management items. This aspect of at least one embodiment of the invention creates only one marker management file even if there are a plurality of stored data files.

The file header stores a file type indicating that marker management file is a text data file in this embodiment, data denoting the checksum value for the entire marker management file, and data indicating the storage capacity of the marker management file. This structure is the same as the file header of the stored data file.

Each marker management item includes a marker name, file ID, and storage location. For example, marker management item [1] contains break marker [1] as the marker name, a file ID of "1", and a storage location of "00000000"; marker management item [2] contains break marker [2] as the marker name, a file ID of "1", and a storage location of "00123456"; and marker management item [n] contains break marker [n] as the marker name, a file ID of "1", and a storage location of "07890123".

Marker management item [x] contains break marker [x] as the marker name, a file ID of "1", and a storage location of "34567890"; marker management item [x+1] contains break marker [x+1] as the marker name, a file ID of "2", and a storage location of "00000000"; and marker management item [x+n] contains break marker [x+n] as the marker name, a file ID of "2", and a storage location of "09012345".

The marker name is a fixed-length value, and the file ID and storage location are also fixed-length values. Each marker management item therefore has a fixed length.

The file ID stores the number of the stored data file in which the variable length data corresponding to the marker name is stored, and the storage location denotes the beginning of the variable length data corresponding to each marker name in that stored data file.

Because the data length of the variable length data is stored at the beginning of each variable length data item as described above, the desired variable length data can be correctly extracted based on this data length.

For example, if a search is executed for particular search criteria and the marker name in the search criteria is break marker [1], the storage location of the stored data file [1] is known to be "00000000" and the data length [1] of the variable length data [1] starting at this storage location is read. Data of a length equal to this data length [1] is then read, and this read data is the desired variable length data.

Likewise, if a search command is executed for particular search criteria and the marker name in the search criteria is break marker [2], the storage location of the stored data file [1] is known to be "00123456". If a search command is executed for particular search criteria and the marker name in the search criteria is break marker [n], the storage location of the stored data file [1] is known to be "07890123". If a search command is executed for particular search criteria and the marker name in the search criteria is break marker [x], the storage location of the stored data file [1] is known to be "34567890". If a search command is executed for particular search criteria and the marker name in the search criteria is break marker [x+1], the storage location of the stored data file is known to be "00000000", and if a search command is executed for particular search criteria and the marker name in the search criteria is break marker [x+n], the storage location of the stored data file [2] is known to be "09012345". The desired variable length data is thus read in each of these cases.

Note that storage location "00000000" denotes the position immediately after the file header, but the beginning of the stored data file may be used as the beginning of the storage location.

The marker name is preferably an alphanumeric value that is automatically generated according to prescribed rules. The marker name may be a serial number that is incremented each time variable length data is created, but if the variable length data is transaction data produced with each transaction, the marker name is preferably a combination of the date and time of the transaction for utilitarian purposes.

This date and time value may take a format such as "YY/MM/DD/hh/mm/ss" where "YY" denotes the last two digits of the Gregorian calendar year, "MM" denotes the month, "DD" denotes the day, "hh" denotes the hour (in 24-hour time), "mm" denotes the minute, and "ss" denotes the second. Note that the backslash "/" is the demarcation character. It will also be obvious that the format of the date and time information is not limited to the format described above.

If the date and time is used as the marker name as described above, transaction data for a specified date and time can be easily extracted, and if the search criteria is set to a particular day or month, all variable length data describing the content of all transactions on the specified day or month can be easily extracted and tabulated.

Furthermore, if the variable length data is transaction data, the date and time value is preferably the date and time at which the transaction was completed, or more specifically the date and time at which the journal information was printed if the variable length data is generated at the cash register of a POS (point of sale) terminal, for example.

Note, further, that the marker name is described above as a text value conforming to a particular rule, but the marker name may be an irregular value such as a customer identification number. CPU1 controls these processing.

* Structure of the Marker Management Memory Area

As described above, if a search command is asserted using search criteria retrieved from the marker management file of at least one embodiment of the invention, the starting address of the variable length data corresponding to the marker name matching the search value can be known and directly specified. The search process can be accelerated accordingly.

The structure of the marker management memory area according to at least one embodiment of the invention is described next with reference to FIG. 4.

As shown in FIG. 4, a plurality of marker identifier management items are stored in the marker management memory area.

Each marker identifier management item includes a marker identifier name, a file ID, and the marker name location. For example, marker identifier management item [1] contains marker identifier [1] as the marker identifier name, file ID "1", and the marker name location "0000", marker identifier management item [2] contains marker identifier [2], file ID "1" and the marker name location "0256", marker identifier management item [n] contains marker identifier [n], file ID "1" and marker name location "1024", marker identifier management item [x] contains marker identifier [x], file ID "1" and marker name location "2048", marker identifier management item [x+1] contains marker identifier [x+1], file ID "2" and marker name location "2304", and marker identifier management item [x+n] contains marker identifier [x+n], file ID "2" and marker name location "4096".

Because the marker identifier name, file ID and marker name location are also fixed-length values, the marker identifier management item is also a fixed length.

The marker identifier name is a fixed-length character string starting from the first character in the corresponding break marker. For example, marker identifier [1] is the string "07/11/11" if the corresponding break marker [1] is the string "07/11/11/13/44/20". Note that as described above the character string "07/11/11/13/44/20" denotes the date 11 Nov. 2007 and the time 13:44:20.

The file ID is the identifier (ID) of the stored data file containing variable length item [α]. Because the marker name location only indicates the beginning of the marker management item in the marker management file, it may be shorter than the length of the storage location values stored in the marker management items stored in the marker management file.

Furthermore, because the marker name, the file ID, and the storage location of the break marker in the stored data file storing the variable length data are registered in the marker management item, the marker management items are structured so that the desired variable length data can be correctly extracted. Therefore, if a search command is executed with the defined search criteria and the marker identifier name in the search criteria matches marker identifier [1], the marker name location "0000" of the marker management file is specified, marker management item [1] is read, and the break marker name in the search criteria is compared with the break marker of marker management item [1]. If the values match, the storage location "00000000" of stored data file [1] is retrieved from the file ID and storage location registered in marker management item [1]. The data length [1] of the variable length data [1] is then read, and variable length data [1] of the length specified by this data length [1] is read. Operation is the same if the marker identifier name in the search criteria matches a different marker identifier.

Note that when the marker identifier name in the search criteria is compared with the marker identifier, only a predetermined number of characters is used from the beginning of the string. This is described in further detail below.

Note that because the marker identifier name is composed of fewer characters than the corresponding marker name, the search may return plural marker identifier names if the search command is executed with search criteria that is longer than the marker identifier name, such as a search value containing not only the date but also the time, but it is not possible to identify the variable length data to be read in this case. However, because the storage location of the corresponding marker name in the marker management file, that is, the location of the marker name, is registered in the marker identifier management item, the specified marker name can be found by comparing the marker name specified in the search criteria with the marker name corresponding to each marker identifier name that is hit by the search. It will be obvious that if the specified marker name is found, the desired variable length data can be read.

Because the data lengths of the marker identifier and the marker name location are short if the marker management memory area of at least one embodiment of the invention is used, the marker identifier name comparison process and the marker name location retrieval process can be executed quickly. In addition, because the marker management memory area is rendered by the main storage device 5 and a separate EEPROM 6, pressure is not put on the storage capacity of the main storage device 5 by these processes. A small capacity EEPROM 6 may also be used.

Furthermore, by using the marker name location from the marker identifier management item once a marker identifier name matching the marker identifier name of the specified search criteria is found, the specified marker management item can be copied to the main storage device 5 instead of copying the entire marker management file to the main storage device 5 to compare the marker name specified in the search criteria with the marker name of the expanded marker management item. Pressure is thus not put on the storage capacity of the main storage device 5, the memory resources of the computer can be used effectively, and the desired variable length data can be read even more quickly.

The marker management memory area described above is rendered by the main storage device 5 and EEPROM 6 as a separate storage device, but the marker management memory area may alternatively be constructed on a external storage device 7. In this case a plurality of marker identifier management items can be registered in a single management file called a marker identifier management file, for example. Note that if the marker management memory area is constructed on the external storage device 7, the entire marker identifier management file is written to the main storage device for processing, but because the marker identifier management file is smaller than the marker management file as described above, unintentional pressure will not be put on the storage capacity of the main storage device.

* Variable Length Data Storage Procedure

The process of storing variable length data according to at least one embodiment of the present invention is described next with reference to the flow chart in FIG. 5.

* Reading New Data

Whether new data was input or not is determined (S501), and if there is no new data input (S501: no), step S501 repeats to determine if new data is input.

If new data was input (S501: yes), the input variable length data [α] and the marker name, break marker [α], are retrieved (S502). As described above, the break marker [α] in this aspect of at least one embodiment of the invention is a text string denoting the date and time of the transaction when the variable length data is transaction data resulting from a sales transaction, for example. The format of this text string may be in the format "YY/MM/DD/hh/mm/ss" as described above. CPU1 automatically generates the break marker name from the transaction data by the predetermined rule.

* Calculating the Data Length and Creating a Marker Identifier

The data length [α] of the retrieved variable length data [α] is then calculated (S503) and a marker identifier [α] is created (S504). The marker identifier [α] that is the marker identifier name is a text string of a predetermined number of characters from the beginning of the text string rendering the retrieved break marker [α].

* Confirming Break Marker Uniqueness

If the retrieved break marker [α] is not unique to the particular variable length data [α], it cannot be used as a search key, and verifying the uniqueness of the break marker [α] is therefore necessary. This verification process is described next.

One marker identifier management item already registered in the marker management memory area is read (S505). Marker identifier management item [1] is read first. If a marker identifier management item is not registered in the marker management memory area, nothing has been stored and this is a completely new registration process. As a result, variable length item [1] of "data length+variable length data [α]" is stored in stored data file [1] after the file header with no gap between the variable length data and the file header. Writing data to the stored data file is described in further detail below.

After the marker identifier management item is read, whether the created marker identifier [α] matches the marker identifier name of the read marker identifier management item is determined (S506). If the created marker identifier [α] does not match the marker identifier name of the read marker identifier management item (S506: no), whether a marker identifier management item that has not been read is determined (S507). If there is a marker identifier management item that has not been read (S507: yes), the marker identifier management item read process repeats to read the next marker identifier management item from the marker management memory area (S505). If there is not a marker identifier management item that has not been read (S507: no), control continues as described below in the section on storing to the stored data file.

If the created marker identifier [α] matches the marker identifier name of the read marker identifier management item (S506: yes), the retrieved break marker [α] may match an existing marker name, and whether they match must therefore be determined. This process is described below.

The corresponding marker management item registered in the marker management file is read based on the marker name location of the read marker identifier management item (S513), and whether the retrieved break marker [α] matches the marker name of the read marker management item is determined (S514). If the retrieved break marker [α] does not match the marker name of the read marker management item (S514: no), whether there is a marker identifier management item that has not been read is determined (S507). If there is (S507: yes), control returns to the marker identifier management item read process, and the next marker identifier management item is read from the marker management memory area (S505). If there is not a marker identifier management item that has not been read and processed (S507: no), control proceeds as described below in the section on storing to the stored data file.

If the read break marker [α] matches the marker name of the read marker management item (S514: yes), the retrieved break marker [α] is not unique, the break marker [α] is therefore invalidated (S515), and the user is prompted to input a correct break marker [α] (S516). If a break marker [α] is entered again, a new marker identifier [α] is created based on the newly input break marker [α] (S504). Note that if invalidating the break marker [α] (S515) repeats a predetermined number of times, operation may be aborted due to an error (ERROR END).

* Storing to the Stored Data File

When there is no marker identifier management item that has not been read and processed (S507: no), the acquired break marker [α] will be unique.

After confirming the uniqueness of the retrieved marker name as described above, whether there is enough space to store the data length [α] plus the variable length data [α] in the currently active stored data file is determined (S508). If there is not enough empty space in the current stored data file (S508: no), a new stored data file is created and made the current stored data file (S517). The ID of the new stored data file is the ID of the old stored data file +1.

If there is enough space in the stored data file currently selected for storing data to store "data length [α]+variable length data [α]" (S508: yes), or if a new stored data file is created and made the current stored data file (S516), variable length item [α] composed of "data length [α]+variable length data [α]" is stored contiguously with no gaps in the space available in the current stored data file, or more specifically contiguously from the position following the last variable length data already stored in the file or from the position following the file header (S509).

* Registering an Item in the Marker Management File

When storing a new variable length item [α] is completed, a new marker management item [α] including break marker [α] as the marker name, the file ID of the stored data file storing the variable length item [α], and the storage location of the variable length item [α], is registered in the open area in the marker management file (S510). As will be known from the previous description, the storage location of the variable length item [α] is the location of the data length [α] prepended to the beginning of the variable length data [α].

* Registering in the Marker Management Memory Area

When registering marker management item [α] is completed, a new marker identifier management item [α] is registered in empty space in the marker management memory area. As described above, the marker management item [α] includes the generated marker identifier [α] as the marker identifier name, the file ID of the stored data file storing the variable length item [α], and the location of the marker name of the marker management item [α] as the marker name location (S511). As described above, the identifier [α] is composed of the predetermined number of characters from the beginning of the text string rendering the corresponding break marker [α]. Note that the ID of the stored data file storing the variable length item [α] may be omitted.

* Termination Process

After storing the variable length item [α] and registering marker management item [α] and marker identifier management item [α] are completed, whether or not to end terminate the storage process must be decided (S512). If the storage process is not stopped (S512: no), control returns to step S501) to determine if there is new data input.

* Reading Variable Length Data

The procedure for reading variable length data according to at least one embodiment of the present invention is described next with reference to the flow chart in FIG. 6. CPU1 controls these processing.

* Getting Search Criteria

Whether a search command was asserted is detected (S601). If a search command was not asserted (S601: no), the step S601 repeats.

If a search command was asserted (S601: yes), the input search criteria [β] is acquired (S602). As described above, the search criteria [β] has the same format as the marker name. More specifically, the search criteria has a format such as "07/11/13/09/00/20" and means "what transactions occurred on 13 Nov. 2007 at 9:00:20?" Note that the seconds value is not used in general practice.

\* Creating a Marker Identifier

The marker identifier [β] is then created as the marker identifier name using a prescribed number of characters from the beginning of the text string defining the acquired search criteria [β] by CPU1. If the number of characters in the text string defining the acquired search criteria [β] is the same as or less than the number of characters in the text string rendering the marker identifier, the acquired search criteria [β] is used directly as the created marker identifier [β]. This is because the part of the text string exceeding the number of characters in the string used as the marker identifier in the search criteria [β] is not used for comparison with the marker identifier of the marker identifier management item registered in the marker management memory area.

\* Searching for Variable Length Data

One marker identifier management item registered in the marker management memory area is first read (S604). Marker identifier management item [1] is read first.

After reading the marker identifier management item, whether the marker identifier [β] matches the marker identifier name in the read marker identifier management item is determined (S605). If the number of characters in the text string of the search criteria [β] is less than the number of characters in the text string rendering the marker identifier of the marker identifier management item, the number of characters in the text string rendering the marker identifier [β] created from the search criteria [β] will be less than the number of characters in the text string rendering the marker identifier name of the marker identifier management item. In this case, however, a match can be determined by comparing the number of characters in the text string rendering the search identifier [β] from the beginning of the marker identifier in the marker identifier management item.

If the generated marker identifier [β] does not match the marker identifier name of the read marker identifier management item (S605: no), whether there is a marker identifier management item that has not been read is determined (S611). If there is a marker identifier management item that has not been read (S611: yes), control returns to the marker identifier management item read process and the next marker identifier management item is read from the marker management memory area (S604). If there is no marker identifier management item that has not been read (S611: no), controls goes to the operation described in outputting the search result below.

If the generated marker identifier [β] matches the marker identifier name of the read marker identifier management item (S605: yes), the marker management item corresponding to the marker identifier name from the marker identifier management item is read from the marker management file (S606). The marker management item is read based on the marker name location of the marker identifier management item.

Whether the acquired search criteria [β] matches the marker name of the read marker management item is then determined (S607). As will be understood from the foregoing description, the search command is executed with the number of characters in the text string rendering the search criteria [β] less than the number of characters in the text string rendering the marker name, and a match is determined in this case by comparing the number of characters in the text string rendering the search criteria [β] from the beginning of the marker name.

If the search criteria [β] does not match the marker name of the read marker management item (S607: no), whether there is a marker identifier management item that has not been read is determined (S611). If there is a marker identifier management item that has not been read (S611: yes), control returns to the marker identifier management item read process and the next marker identifier management item is read from the marker management memory area (S604). If there is not a marker identifier management item that has not been read (S611: no), control goes to the operation described in outputting the search result below.

\* Reading from a Stored Data File

If the search criteria [β] matches the marker name of the marker management item (S607: yes), a specific stored data file is accessed based on the file ID of the marker management item and the storage location (S608), and the prescribed amount of data is read from the beginning of the corresponding variable length data (S609). Because each variable length item starts with the data length of the item prepended to the variable length data as described above, the data length of the desired variable length data can be easily retrieved. Note that the data length value is a fixed-length value as described above.

It will thus be apparent that the marker management item in this embodiment of the invention includes a marker name, file ID, and storage location, and is a logical construct denoting the storage location of the variable length data. Therefore, a specific amount of data can be acquired from the beginning of the corresponding variable length data based on the storage location and file ID of the marker management item even if there is no break marker data in the stored data file. In addition, a plurality of break markers can be linked to a single variable length data item.

The desired variable length data is then read based on the acquired data length (S610).

Because there is not necessarily only one marker name that matches the search criteria [β], or more specifically because the desired variable length data is not limited to only one block of variable length data, whether there is a marker identifier management item that has not been read is again determined (S611). If there is (S611: yes), control returns to the marker identifier management item read process, and the next marker identifier management item is read from the marker management memory area (S604).

\* Outputting the Search Result

Because searching based on this search command has been completed if there is not a marker identifier management item that has not been read (S611: no), all variable length data that was read is output to the display 3 or printer 4 (S612). The search result may also be stored as a file in the external storage device 7. A data processing operation, such as totalling transaction data, may also be applied to the read variable length data, and the result of this data process may also be output or stored to further improve utility.

\* Termination Process

Whether to terminate the search process is determined after outputting the search result (S613). If the search result continues (S613: no), control returns to the step for determining if a new search command was asserted (S601).

The reading method according to this embodiment of the invention enables search commands in which the number of characters in the text string rendering the search criteria is less than the number of characters in the marker name. For example, in a computer in which the marker name is a text string of 17 characters in the format "YY/MM/DD/hh/mm/ss", all variable length data matching the specified year and month or year, month, and day can be extracted by specifying as the search criteria a 5-character text string in the format "YY/MM" or an 8-character text string in the format "YY/MM/DD".

* Functional Configuration and Input/Output Device

Figure 7:
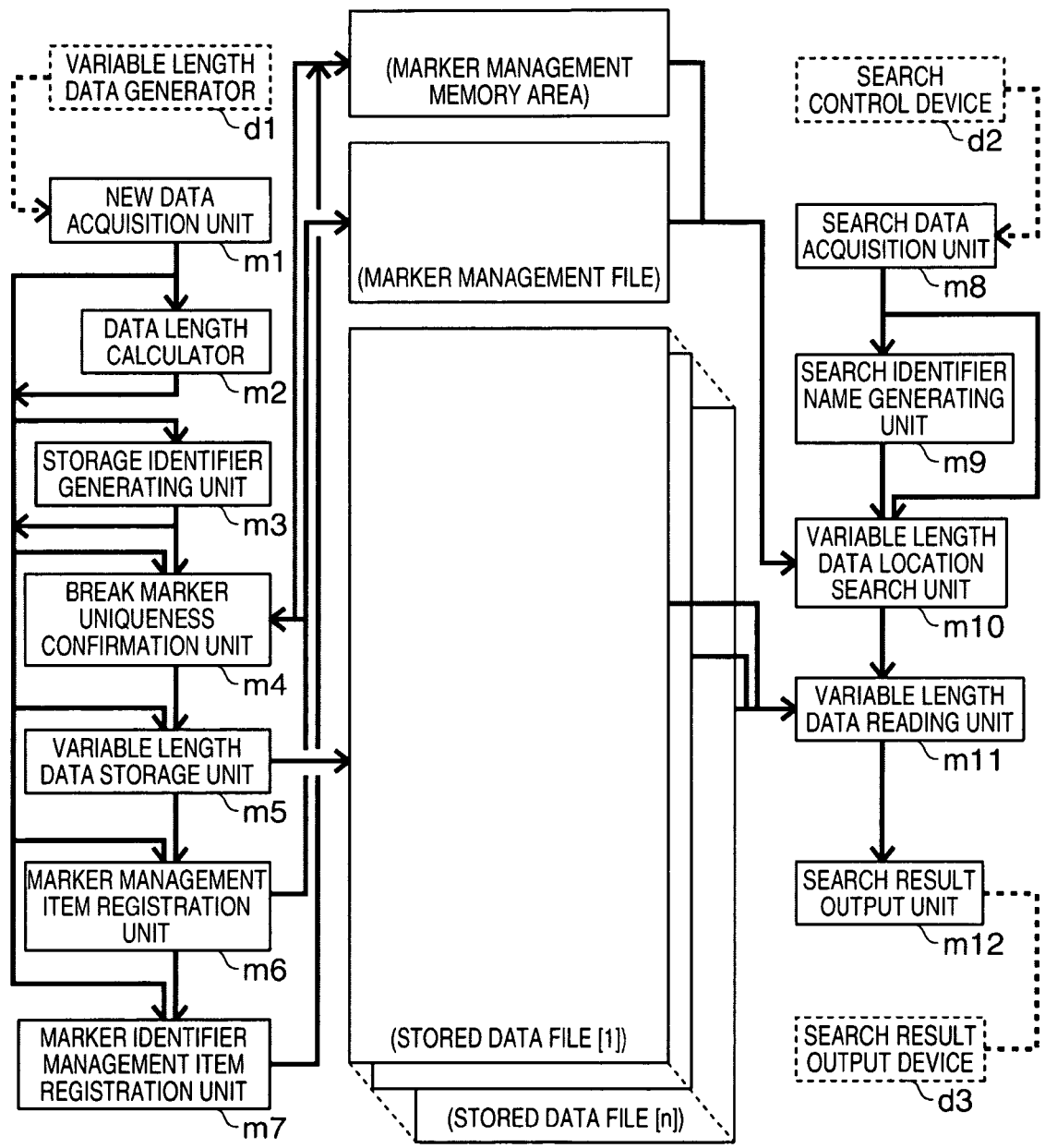
FIG. 7 schematically describes a functional configuration and input/output devices for rendering the variable length data storage method and variable length data reading method of at least one embodiment of the invention, and describes the flow of control and data between the functional units and input/output devices.

The functional configurations and input/output devices for implementing the variable length data storage method and variable length data reading method of at least one embodiment of the invention, and the flow of data and processing between the functional configurations and input/output devices are described next with reference to the schematic diagram in FIG. 7. Note that the portions enclosed by solid lines in the figure denote the functional configurations that are achieved by the storage and reading program being installed to and run by the computer, and the devices enclosed by dotted lines denote the input/output devices of the computer.

* Variable Length Data Generating Device

The variable length data generator d1 is an input device for generating the variable length data and marker name. An example of such a variable length data generator d1 is a cash register of a POS terminal. The cash register of a POS terminal is rendered to print a receipt or other such journal information when a particular transaction is completed, and the date and time values denoting when the data was printed can be used as a marker name that is sufficiently unique to the particular transaction data.

* New Data Acquisition Unit

Figure 5:
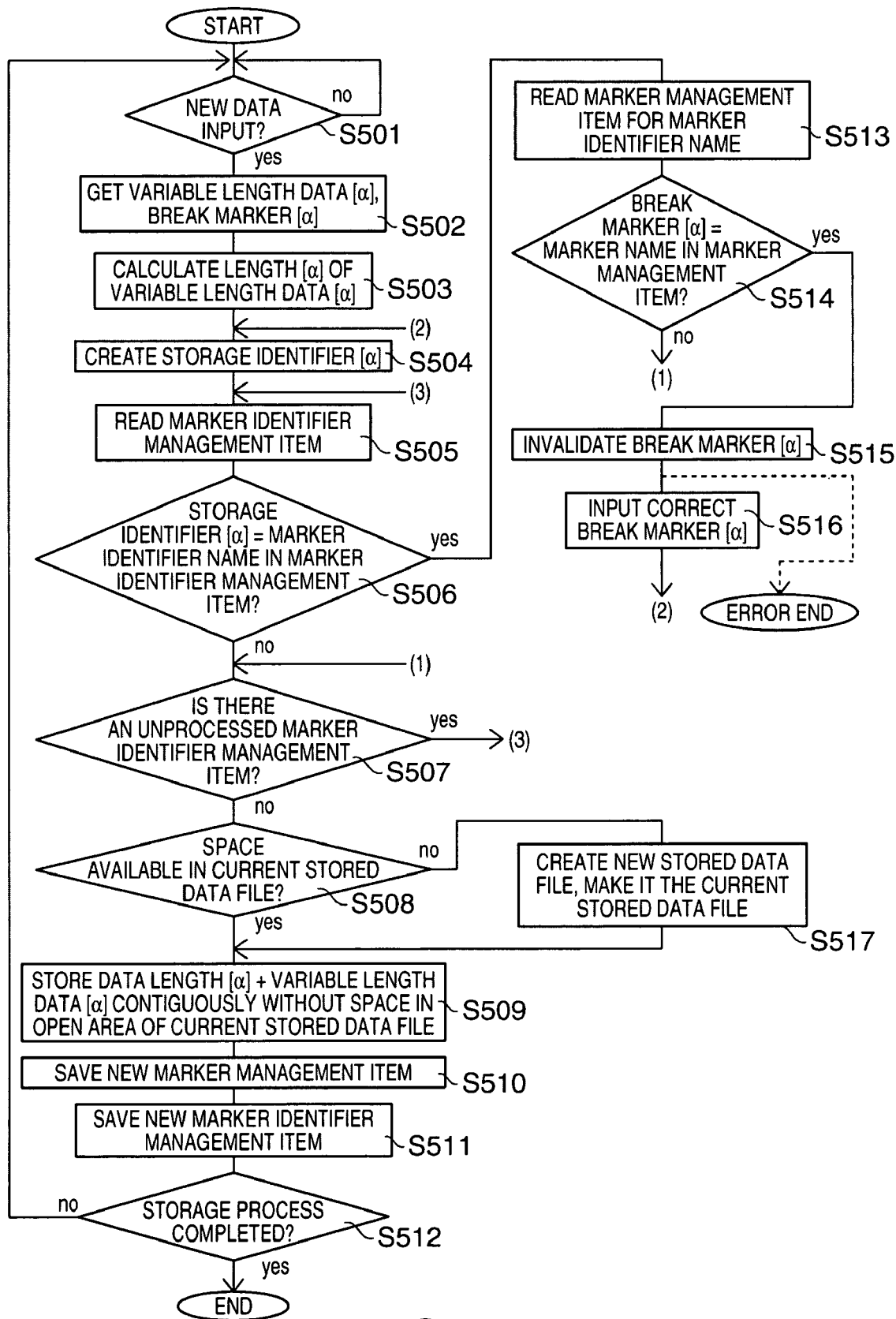
FIG. 5 is a flow chart describing the variable length data storage process of at least one embodiment of the invention.

The new data acquisition unit m1 executes the operation in step S502 in FIG. 5, and acquires the variable length data and marker name created by the variable length data generator d1.

* Data Length Calculation Unit

The data length calculator m2 executes the operation in step S503 in FIG. 5, and calculates the data length of the acquired variable length data.

* First Marker Identifier Generating Unit m3

The storage identifier name generating unit m3 executes step S504 in FIG. 5, receives the acquired marker name, and creates a marker identifier name composed of a prescribed number of characters from the beginning of the text string rendering the marker name. This marker identifier name is created for comparison with the marker identifier names of the marker identifier management items registered in the marker management memory area before the variable length data is stored, and after the variable length data is stored is used as the marker identifier name of the new marker identifier management item registered in the marker management memory area.

* Break Marker Uniqueness Confirmation Unit

The break marker uniqueness confirmation unit m4 executes steps S505-S507 and steps S513-S516 in FIG. 5, and confirms if the acquired marker name is unique. This is confirmed by comparing the created marker identifier name and the acquired marker name with the marker identifier name of the marker identifier management item registered in the marker management memory area and the marker name of the marker management item registered in the marker management file, respectively.

* Variable Length Data Storage Unit

The variable length data storage unit m5 executes steps S508-S509 and S517 in FIG. 5, and after confirming the uniqueness of the acquired marker name, stores the acquired variable length data as a variable length item of "data length+ variable length data" contiguously and without gaps in the stored data file with available space. If the stored data file selected for storage does not have enough space, the variable length data storage unit m5 has a function for creating a new stored data file and specifying the new stored data file as the current stored data file. The ID of this new stored data file is the ID of the old stored data file +1.

* Marker Management Item Registration Unit

The marker management item registration unit m6 executes step S510 in FIG. 5, and writes a marker management item for the stored variable length data in the empty space in the marker management file after storing the acquired variable length data is completed.

* Marker Identifier Management Item Registration Unit

The marker identifier management item registration unit m7 executes step S511 in FIG. 5, and after registering a marker management item for the stored variable length data writes a marker identifier management item for managing the marker management item in the empty space of the marker management memory area. The created marker identifier name is stored in the marker identifier name of the marker identifier management item registered in the empty space of the marker management memory area.

* Search Control Device

The search control device d2 receives the search criteria and executes the search.

* Search Criteria Acquisition Unit

Figure 6:
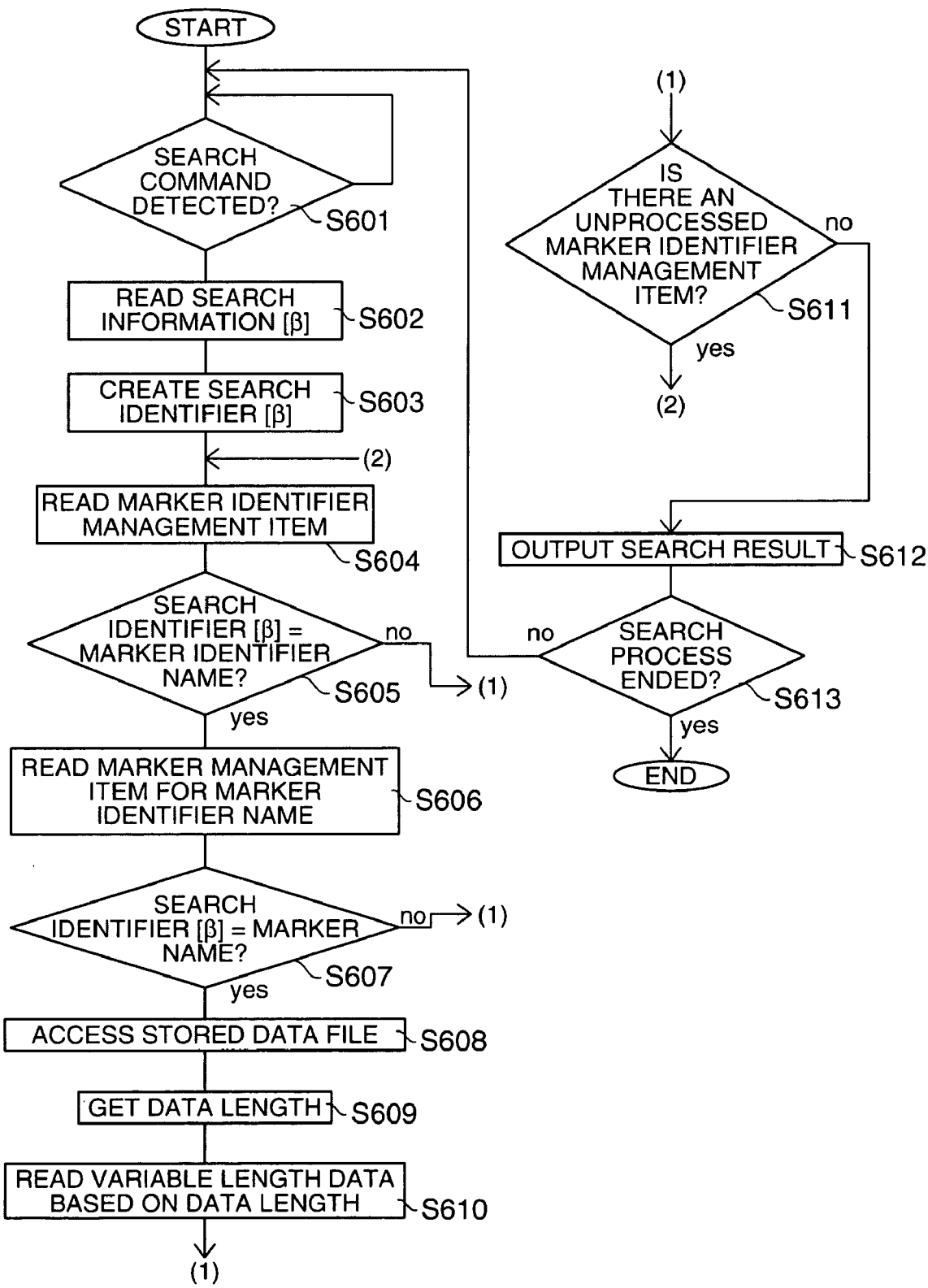
FIG. 6 is a flow chart describing the variable length data reading process of at least one embodiment of the invention.

The search criteria acquisition unit m8 executes step S602 in FIG. 6, and acquires the search criteria generated by the search control device d2.

* Second Marker Identifier Generating Unit

The second marker identifier generating unit m9 executes step S603 in FIG. 6, and generates a marker identifier name for finding a marker identifier name registered in the marker management memory area based on the acquired search criteria. This second marker identifier generating unit m9 serves the same function as the first marker identifier generating unit m3.

* Variable Length Data Location Search Unit

The variable length data location search unit m10 executes steps step S604 to S606 and S611 in FIG. 6, and finds where the variable length data corresponding to the acquired search criteria is stored at what storage location in what stored data file. To do this it compares the acquired marker identifier name and search criteria with the marker identifier name of the marker identifier management item registered in the marker management memory area and the marker name of the marker management item registered in the marker management file.

* Variable Length Data Reading Unit

The variable length data reading unit m11 executes steps step S608-S610 in FIG. 6, and reads the desired variable length data based on the retrieved stored data file ID and variable length data storage location.

* Outputting the Search Result

The search result output unit m12 executes step S612 in FIG. 6, and outputs all of the specified variable length data that was read to the display 3, printer 4, or other external device. Note that the search result output unit m12 may have a function for applying some data processing operation to the read variable length data, such as a daily or monthly tabulation process if the variable length data is transaction data.

* Search Result Output Device

The search result output device d3 is typically a display 3 or printer 4, but may also be the external storage device 7, for example.

* Use in Industry

At least one embodiment of the present invention is not limited to any particular type of data insofar as a unique identification key can be added to the variable length data, and can therefore be applied to processing and reading various kinds of variable length data other than the transaction data described above.

At least one embodiment of the invention being thus described, it will be obvious that it may be varied in many ways. Such variations are not to be regarded as a departure from the spirit and scope of at least one embodiment of the invention, and all such modifications as would be obvious to one skilled in the art are intended to be included within the scope of the following claims.

What is claimed is:

1. A variable length data storage device, comprising:
   a stored data file in which variable length items, each including variable length data and the data length of the corresponding variable length data, are stored;
   a marker management file in which are registered marker management items, each including a break marker, a first file identifier, and a first storage location for corresponding variable length data in the stored data file; and
   a marker management memory area in which are registered marker identifier management items, each including a second file identifier, a mark identifier composed of specific data in the corresponding break marker in the marker management file, and a second storage location of the corresponding break marker in the marker management file;
   wherein the stored variable length items and the registered marker management items and marker identifier management items are arranged to enable access to particular stored variable length data based on a search request with a name of the corresponding mark identifier and a name of the corresponding breaker marker.

2. The variable length data storage device described in claim 1, wherein the break marker is a marker name that is generated according to a predetermined rule when the variable length data is produced, and the mark identifier is a marker identifier name.

3. The variable length data storage device described in claim 2, wherein the predetermined rule is decided based on the date and time when journal information was printed.

4. A variable length data storage method, comprising:
   storing variable length items, each including variable length data and the data length of the corresponding variable length data in a stored data file;
   registering marker management items, each including a break marker, a first file identifier, and a first storage location for corresponding variable length data in the stored data file, in a marker management file; and
   registering marker identifier management items, each including a second file identifier, a mark identifier composed of specific data in the corresponding break marker in the marker management file, and a second storage location of the corresponding break marker in the marker management file, in a marker management memory area;
   wherein the stored variable length items and registered marker management items and marker identifier management items are arranged to enable access to particular stored variable length data based on a search request with a name of the corresponding mark identifier and a name of the corresponding breaker marker.

5. The variable length data storage method described in claim 4, wherein the break marker is a marker name that is generated according to a predetermined rule when the variable length data is produced, and the mark identifier is a marker identifier name.

6. The variable length data storage method described in claim 4, wherein the break marker is used after confirming with reference to the marker management memory area and the marker management file that the break marker is not already used as a break marker.

7. A variable length data storage and reading program for directing a computer to execute the variable length data storage method described in claim 4.

* * * * *